US012596061B2

(12) United States Patent     (10) Patent No.:   US 12,596,061 B2

Hu et al.          (45) Date of Patent:     Apr. 7, 2026

(54) METHOD FOR CALIBRATING DEFORMATION PRESSURE OF LARGE-VOLUME PRESS

(71) Applicant: Jilin University, Changchun City (CN)

(72) Inventors: Kuo Hu, Changchun City (CN); Xinyu Zhao, Changchun City (CN); Ran Liu, Changchun City (CN); Dan Xu, Changchun City (CN); Di Yao, Changchun City (CN); Saisai Wang, Changchun City (CN); Jinze He, Changchun City (CN); Zhaodong Liu, Changchun City (CN); Bingbing Liu, Changchun City (CN)

(73) Assignee: Jilin University, Changchun City (CN)

( * ) Notice: Subject to any disclaimer, the term of this patent is extended or adjusted under 35 U.S.C. 154(b) by 279 days.

(21) Appl. No.: 18/506,334

(22) Filed: Nov. 10, 2023

(65) Prior Publication Data

US 2025/0102410 A1     Mar. 27, 2025

(30) Foreign Application Priority Data

Sep. 21, 2023    (CN) ......................... 202311225830.X

(51) Int. Cl.
    G01N 3/62         (2006.01)

(52) U.S. Cl.
    CPC ....... G01N 3/62 (2013.01); G01N 2203/0266 (2013.01); G01N 2203/0298 (2013.01)

(58) Field of Classification Search
    CPC ............. G01N 3/62; G01N 2203/0266; G01N 2203/0298; G01N 3/12; G01N 3/02; G01N 3/24; G01N 2203/0676; G01N 2203/0682
    See application file for complete search history.

(56) References Cited

FOREIGN PATENT DOCUMENTS

CN       113337787 A   *   9/2021   ............... C22F 1/04
CN       116084004 A   *   5/2023   ............... C30B 1/12

OTHER PUBLICATIONS

"Design of a novel large volume cubic high pressure apparatus for raising the yield and quality of synthetic diamond" by Han et al. ( Year: 2015).*
"Powder conductor for pressure calibration applied to large vol. press under high pressure" by Huang et al. (Year: 2021).*
CN116084004 English translation.*

* cited by examiner

*Primary Examiner* — Xin Y Zhong
(74) *Attorney, Agent, or Firm* — Rothwell, Figg, Ernst & Manbeck, P.C.

(57) ABSTRACT

Provided is a method for calibrating a deformation pressure of a large-volume press. The method for calibrating the deformation pressure of the large-volume press includes: depositing a conductive layer onto a surface of a bevel plug to obtain a conductive bevel plug; assembling the conductive bevel plug, a molybdenum pillar, a magnesium oxide tube, a magnesium oxide sample chamber, a magnesium oxide octahedron and a calibration standard material, placing a resulting system in the large-volume press, and subjecting the resulting system to a large-volume press pressure correction experiment.

11 Claims, 4 Drawing Sheets

0.8mm 0.8mm

METHOD FOR CALIBRATING DEFORMATION PRESSURE OF LARGE-VOLUME PRESS

CROSS-REFERENCE TO RELATED APPLICATION

This patent application claims the benefit and priority of Chinese Patent Application No. 202311225830X filed with the China National Intellectual Property Administration on Sep. 21, 2023, the disclosure of which is incorporated by reference herein in its entirety as part of the present application.

TECHNICAL FIELD

The present disclosure belongs to the technical field of large-volume press, and in particular relates to a method for calibrating a deformation pressure of a large-volume press.

BACKGROUND

45° bevel alumina is introduced by researchers by improving the internal assembly design of the press, thus achieving deformation stress loading in large-volume presses. With this technique, people have studied the structural transformation mechanism of olivine and other materials under high temperature and high pressure, and further revealed the interaction between subduction plate and asthenosphere and the formation of marine lithosphere and so on in geoscience.

Indirect pressure calibration method is usually used for pressure calibration of large-volume presses. Metallic copper or molybdenum pillars with good conductivity are placed above and below the calibration standard materials such as Bi, ZnTe, ZnS and GaAs, and the change trend of resistance value of the calibration standard material with pressure is tested by an external ohmmeter. According to the relationship between the phase transition pressure point and the abrupt change point of the resistance value of the calibration standard material, the relationship between the pressure and the oil pressure load in a sample chamber of the large-volume press is determined. However, the modified alumina assembly used to produce deformation pressure loading has poor conductivity, making it difficult to carry out pressure correction experiments. Therefore, deformation high-pressure experiments are usually carried out with reference to the pressure calibration data of hydrostatic pressure. This estimation method undoubtedly has errors in determining the true pressure value of the sample chamber, and thus it is urgent to design and develop an assembly capable of accurately calibrating high-pressure deformation.

SUMMARY

In view of this, the present disclosure is to provide a method for calibrating a deformation pressure of a large-volume press. The method provided by the present disclosure can improve the accuracy of calibrating the pressure of an assembly formed by a bevel plug.

To solve the technical problem above, the present disclosure provides a method for calibrating a deformation pressure of a large-volume press, including the following steps: depositing a conductive layer onto a surface of a bevel plug to obtain a conductive bevel plug; and assembling the conductive bevel plug, a molybdenum pillar, a magnesium oxide tube, a magnesium oxide sample chamber, a magnesium oxide octahedron and a calibration standard material, placing a resulting system in the large-volume press, and subjecting the resulting system to a large-volume press pressure correction experiment.

In some embodiments, the bevel plug is a diamond bevel plug or an alumina bevel plug.

In some embodiments, an inclined plane of the bevel plug has an angle of 45°.

In some embodiments, the conductive layer is made of copper or molybdenum.

In some embodiments, the conductive layer has a thickness of 1.62 μm to 1.65 μm.

In some embodiments, the calibration standard material is zinc telluride.

In some embodiments, prior to the assembling, the method further includes: grinding the zinc telluride, and then conducting an annealing treatment.

In some embodiments, the annealing treatment is conducted at a temperature of 98° C. to 102° C. for 1.8 h to 2.2 h.

In some embodiments, heating to the temperature for the annealing treatment is conducted at a heating rate of 4° C./min to 6° C./min.

The present disclosure also provides a bevel plug, the bevel plug is made of diamond, and an inclined plane of the bevel plug has an angle of 45°.

The present disclosure provides a method for calibrating a deformation pressure of a large-volume press, including the following steps: depositing a conductive layer onto a surface of a bevel plug to obtain a conductive bevel plug; and assembling the conductive bevel plug, a molybdenum pillar, a magnesium oxide tube, a magnesium oxide sample chamber, a magnesium oxide octahedron and a calibration standard material, placing a resulting system in the large-volume press, and subjecting the resulting system to a large-volume press pressure correction experiment. In the present disclosure, by combing chemical vapor deposition with a semiconductor plug for the first time, a layer of conductive metallic copper or molybdenum is deposited onto the surface of an alumina plug, which not only retains the bevel characteristic, but also improves the conductive characteristics of the assembly remarkably, thus achieving calibrating the pressure of the assembly formed by the bevel plug.

DETAILED DESCRIPTION OF THE EMBODIMENTS

Figure 1:
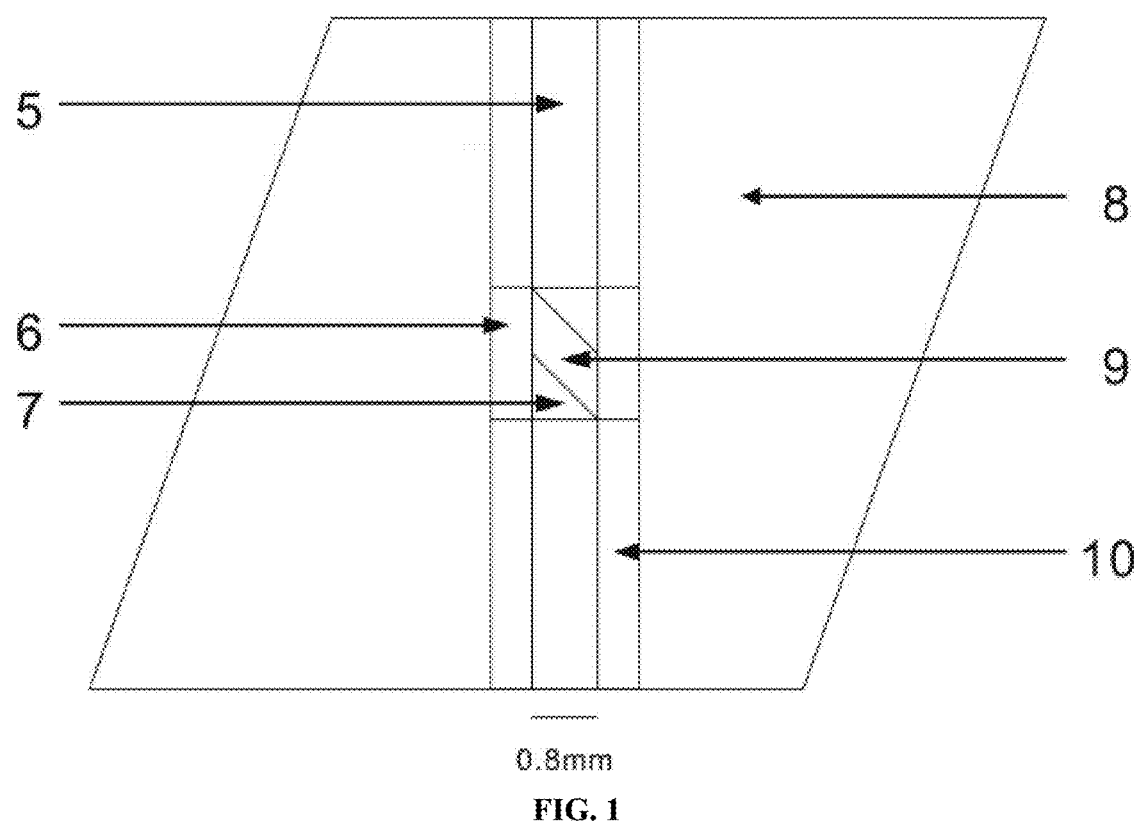
FIG. 1 is a structural diagram of an assembly obtained by assembling according to an embodiment of the present disclosure, in which 5 refers to a molybdenum pillar electrode, 6 refers to a magnesium oxide sample chamber, 7 refers to a conductive bevel plug, 8 refers to a magnesium oxide octahedron, 9 refers to a calibration standard material, and 10 refers to a magnesium oxide tube.

The present disclosure provides a method for calibrating a deformation pressure of a large-volume press, including the following steps:

depositing a conductive layer onto a surface of a bevel plug to obtain a conductive bevel plug; and assembling the conductive bevel plug, a molybdenum pillar, a magnesium oxide tube, a magnesium oxide sample chamber, a magnesium oxide octahedron and a calibration standard material, placing a resulting system in the large-volume press, and subjecting the resulting system to a large-volume press pressure correction experiment.

In the present disclosure, the conductive layer is deposited onto a surface of a bevel plug to obtain a conductive bevel plug. In the present disclosure, the bevel plug is a diamond bevel plug or an alumina bevel plug, more preferably the alumina bevel plug. In some embodiments of the present disclosure, an inclined plane of the bevel plug has an angle of 45°. In some embodiments of the present disclosure, the bevel plug is obtained by cutting a cylindrical plug. In some embodiments of the present disclosure, the cylindrical plug has a diameter of 0.8 mm to 2.5 mm and a height of 1 mm to 1.5 mm. In some embodiments of the present disclosure, the cylinder is cut from the middle.

In some embodiments of the present disclosure, the conductive layer is made of copper or molybdenum, more preferably copper. In some embodiments of the present disclosure, the conductive layer has a thickness of 1.62 μm to 1.65 μm, more preferably 1.632 μm to 1.647 μm. In some embodiments of the present disclosure, the deposition mode includes chemical vapor deposition or magnetron sputtering, more preferably magnetron sputtering. In the present disclosure, there is no special limitation on the magnetron sputtering, and the conventional method in the art may be adopted.

In the present disclosure, a layer of conductive metal is deposited onto the surface of a bevel insulating plug, which not only retains the bevel characteristics, but also improves the conductivity of the assembly remarkably. In the present disclosure, not only the deformation pressure loading of the alumina bevel plug is calibrated, but also the deformation pressure loading of the insulated diamond bevel plug is calibrated by using the method. The method is not limited to alumina and diamond, and may also relate to other insulated bevel plug systems, thereby laying a foundation for accurately calibrating the internal pressure of the high-pressure deformation assembly.

After the conductive bevel plug is obtained, the conductive bevel plug, the molybdenum pillar, the magnesium oxide tube, the magnesium oxide sample chamber, the magnesium oxide octahedron and the calibration standard material are assembled, then placed in a large-volume press, and subjected to a large-volume press pressure correction experiment. In some embodiments of the present disclosure, the molybdenum pillar is used as an electrode. In some embodiments of the present disclosure, the calibration standard material is zinc telluride, but not limited to zinc telluride. In some embodiments of the present disclosure, prior to the assembling, the method further includes: grinding the zinc telluride, and then conducting an annealing treatment. In some embodiments of the present disclosure, the grinding is wet grinding, and a dispersant for the wet grinding is anhydrous ethanol. In the present disclosure, a particle size of the zinc telluride is reduced by grinding.

In some embodiments of the present disclosure, the annealing treatment is conducted at a temperature of 98° C. to 102° C., more preferably 100° C. In some embodiments, heating to the temperature for the annealing treatment is conducted at a heating rate of 4° C./min to 6° C./min, more preferably 5° C./min. In some embodiments, the annealing treatment is performed for 1.8 h to 2.2 h, more preferably 2 h. In some embodiments of the present disclosure, the annealing treatment is conducted in a vacuum condition. In the present disclosure, there is no special limitation on the vacuum degree of the vacuum condition, as long as the vacuum condition can be reached.

In the present disclosure, there is no special requirement on the assembling, and the conventional method in the art may be adopted. FIG. 1 is a structural diagram of an assembly obtained by assembling according to an embodiment of the present disclosure, in which 5 refers to a molybdenum pillar electrode, 6 refers to a magnesium oxide sample chamber, 7 refers to a conductive bevel plug, 8 refers to a magnesium oxide octahedron, 9 refers to a calibration standard material, and 10 refers to a magnesium oxide tube.

In the present disclosure, there is no special requirement on the pressure correction experiment mode of the large-volume press, and the conventional method in the art may be adopted.

In the present disclosure, a pressure boosting rate in the correction experiment is preferably 2 min/bar to 5 min/bar, more preferably 3 min/bar to 4 min/bar. In the present disclosure, the change of a resistance value of a sample is recorded at all times in the correction experiment process, and a curve of the resistance of ZnTe calibration standard material versus an oil pressure is drawn. An internal pressure of a cavity is calibrated through an abrupt change of the resistance caused by the phase transition of ZnTe under high pressure, and then a relationship between the loading oil pressure versus a cavity pressure of the large-volume press is established and determined.

The present disclosure also provides a bevel plug. The bevel plug is made of diamond, and an inclined plane of the bevel plug has an angle of 45°. In some embodiments of the present disclosure, the bevel diamond plug is obtained by cutting a cylindrical diamond plug. In some embodiments of the present disclosure, the cylindrical diamond plug has a diameter of 0.8 mm to 2.5 mm and a height of 1 mm to 1.5 mm. In some embodiments of the present disclosure, the bevel diamond plug is obtained by cutting the cylindrical diamond from the middle.

In order to further illustrate the present disclosure, the technical solutions provided by the present disclosure are described in detail below in conjunction with examples, but these examples should not be understood as limiting the scope of the present disclosure.

Example 1

5 mg zinc telluride was placed in an agate mortar, absolute ethanol was added thereto, and the resulting sample was subjected to manual grinding for 2.5 h. The ground sample was placed in a vacuum muffle furnace and then heated to 100° C. at a heating rate of 5° C./min in a vacuum condition. The sample was subjected to a heat preservation annealing treatment for 2 h and then cooled to room temperature with the furnace.

A diamond pillar with a height of 1 mm and a diameter of 0.8 mm was cut into two sections from the middle by a laser cutting machine with an excitation light wavelength of 532 nm, in which there was an angle of 45° between a cutting angle and the cylindrical section, and thus a bevel diamond plug was obtained.

A copper layer with a thickness of 1.63 μm was deposited onto the surface of the bevel diamond plug by magnetron sputtering to obtain a metal-plated bevel diamond plug. In the magnetron sputtering process, the thickness of the copper layer was regulated by sputtering on a silicon wafer as substrate.

Figure 2:
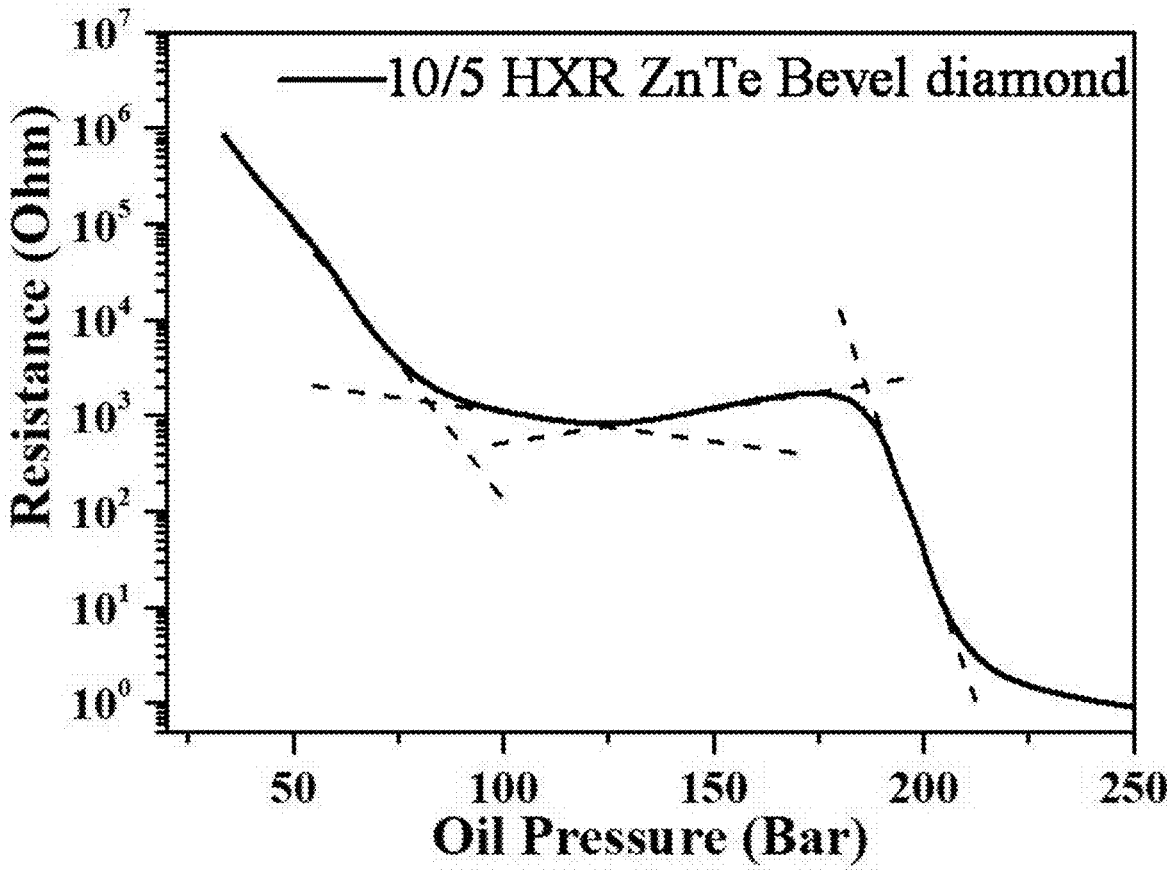
FIG. 2 is a curve graph showing the resistance of the ZnTe calibration standard material according to Example 1 versus an oil pressure.
Figure 3:
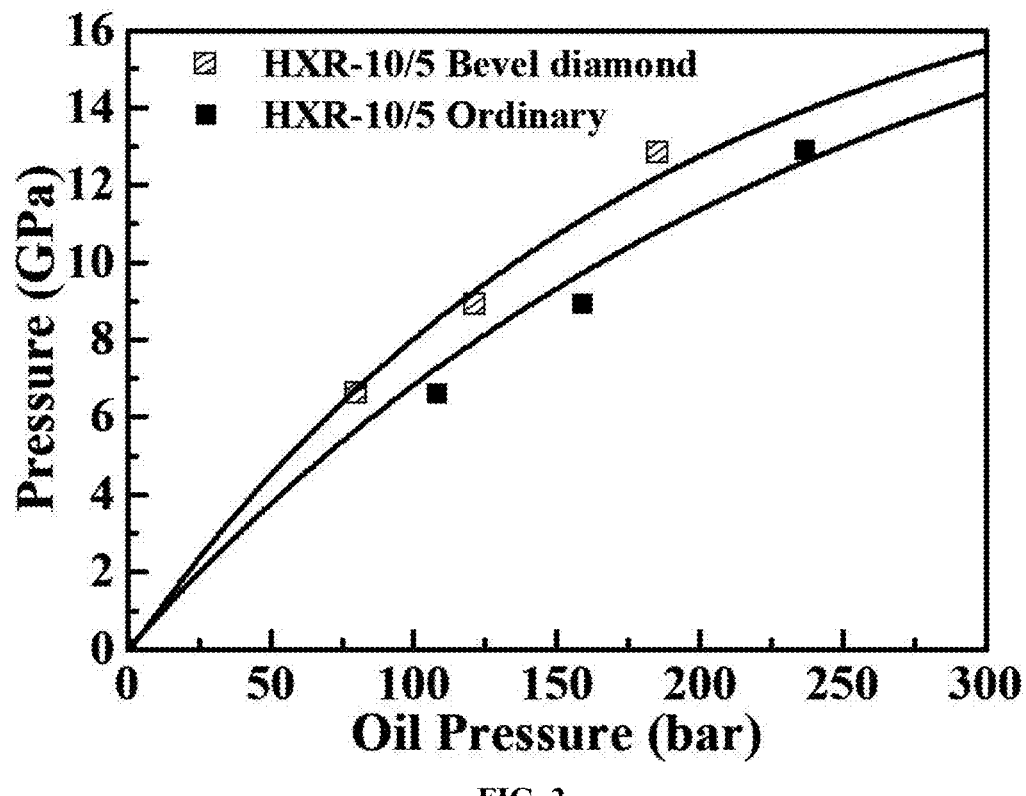
FIG. 3 is a curve graph showing a real pressure versus a loading oil pressure in the large-volume press according to Example 1.

Zinc telluride, a molybdenum pillar, a magnesium oxide tube, a magnesium oxide sample chamber, a metal-plated bevel diamond plug and a magnesium oxide octahedron after annealing treatment were assembled according to a structure shown in FIG. 1 and then placed in a large-volume press, and then subjected to the pressure correction experiment of the large-volume press by boosting the pressure at a boosting rate of 3 min/bar. During the correction experiment, the change of a resistance value of a sample was recorded at all times, and a curve of the resistance of ZnTe pressure standard versus an oil pressure was drawn, as shown in FIG. 2. According to steep drop points of the resistance, the phase transition pressure points of the ZnTe calibration standard material were determined to be 6.6 GPa (zinc blende), 8.9 GPa (cinabar) and 12.9 GPa (Cmcm), respectively. A relationship between the oil pressure versus the pressure in the large-volume press was drawn by using the phase transition pressure points of ZnTe at a high pressure, as shown in FIG. 3. In FIG. 3, a curve with squares with diagonal lines is a test result with a metal-plated bevel diamond plug of Example 1 as the plug, and a curve with black squares is a test result with a molybdenum pillar as the plug. The tungsten carbide named HXR two-stage anvil is used for experimental pressure calibration, but the calibrated pressure is not limited to the HXR. As shown in FIG. 3, comparing pressure calibration curves of a shear pressure and a non-shear pressure, it is found that the pressure boosting efficiency of the shear assembly is remarkably improved by nearly 40 Bar under the same oil pressure. Therefore, the accurate pressure calibration of the high-pressure deformed assembly is necessary to carry out the corresponding experiments, and the method provided by the present disclosure is feasible to accurately calibrate the pressure of the deformed assembly.

Figure 4:
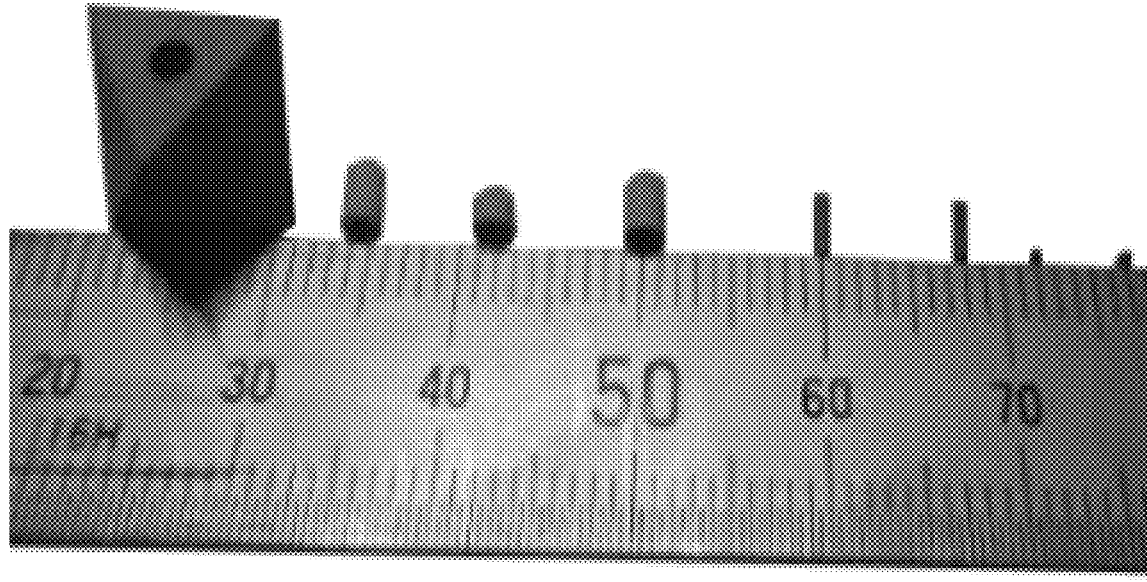
FIG. 4 is a physical diagram of a magnesium oxide octahedron, a magnesium oxide tube, a molybdenum pillar electrode, a magnesium oxide sample chamber and a metal-plated bevel diamond plug used in Example 1.

FIG. 4 is a physical diagram of the magnesium oxide octahedron, the magnesium oxide tube, the molybdenum pillar electrode, the magnesium oxide sample chamber and the metal-plated bevel diamond plug used in Example 1.

Figure 5:
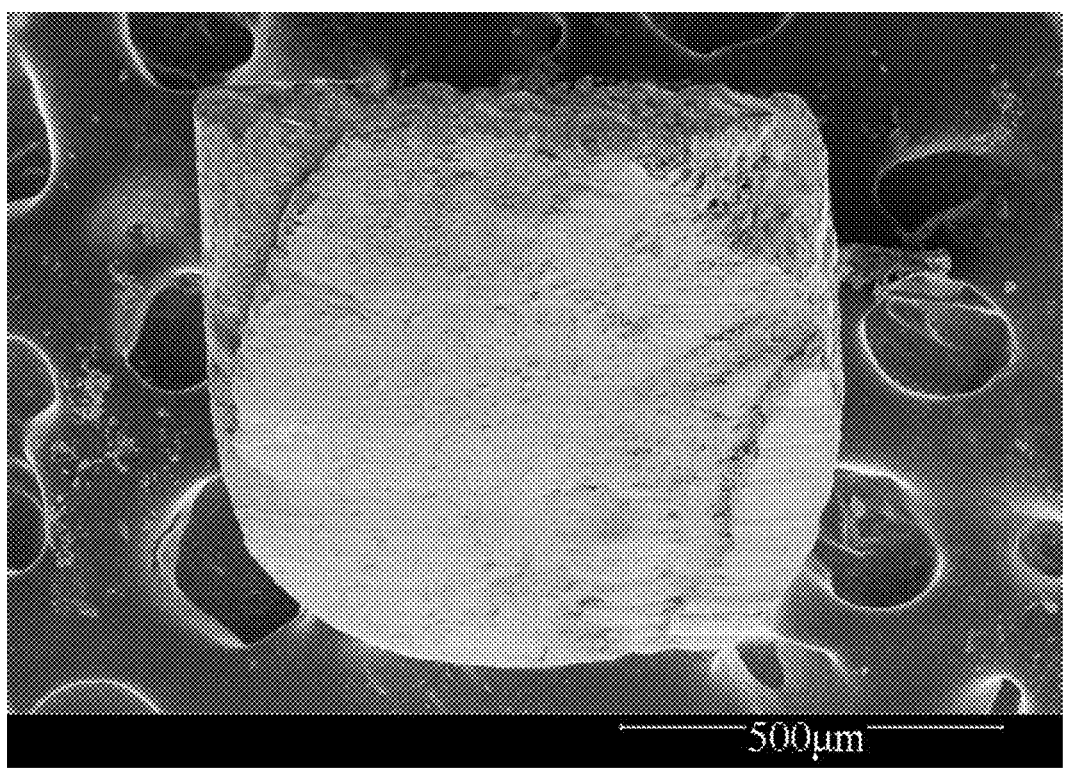
FIG. 5 is a scanning electron microscope (SEM) image of the copper-plated bevel diamond plug according to Example 1.

FIG. 5 is an SEM image of the metal-plated bevel diamond plug according to Example 1.

Figure 6:
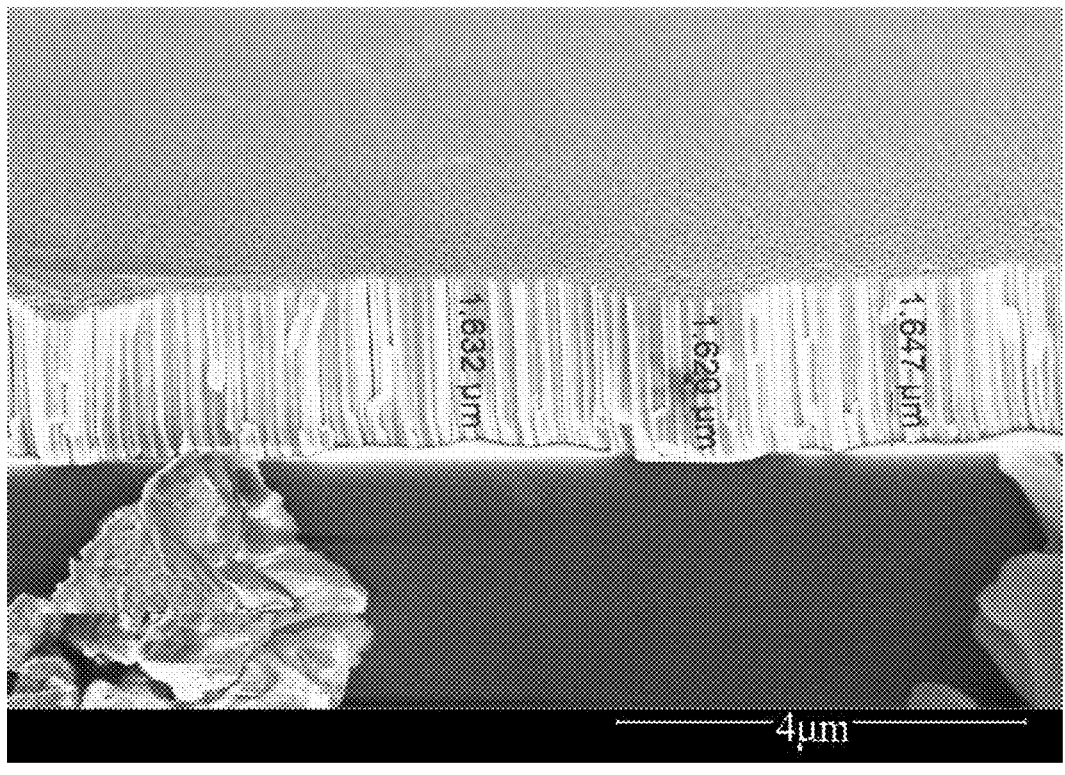
FIG. 6 is an SME image of the metal-plated silicon wafer according to Example 1.

FIG. 6 is an SEM image of the copper layer deposited on a silicon wafer. The thickness of the deposited copper layer can be seen from FIG. 6, such that the thickness of the copper layer deposited on the surface of the bevel diamond plug can be determined.

Example 2

The pressure calibration was conducted according to the method of Example 1, except that the diamond pillar was replaced by an alumina pillar.

6

Figure 7:
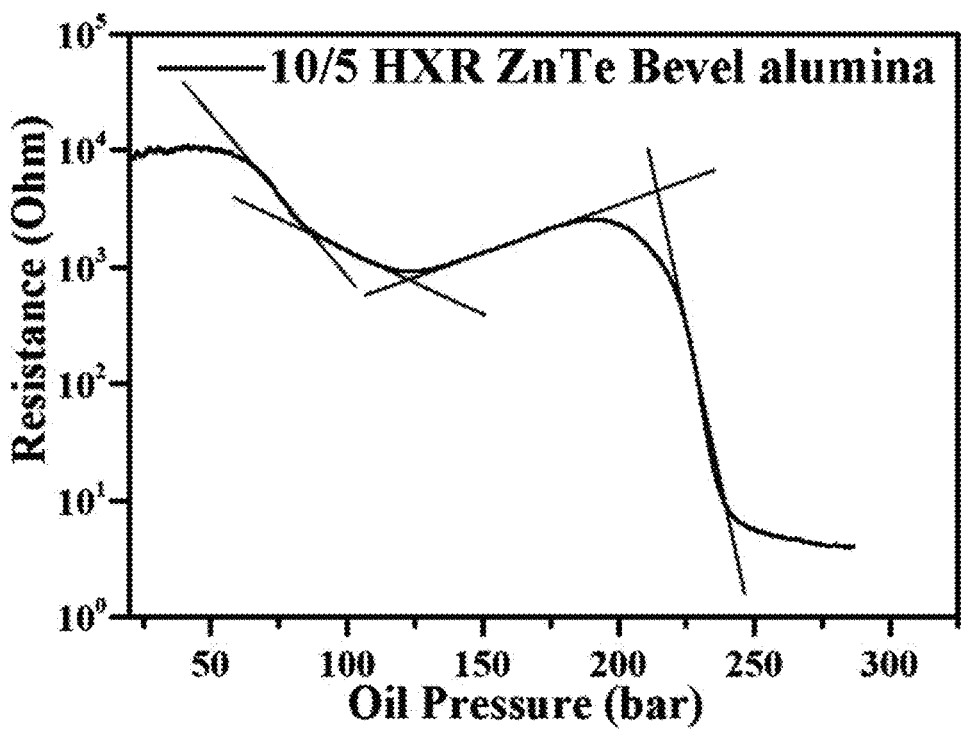
FIG. 7 is a curve graph showing the resistance of a ZnTe calibration standard material according to Example 2 versus an oil pressure.
Figure 8:
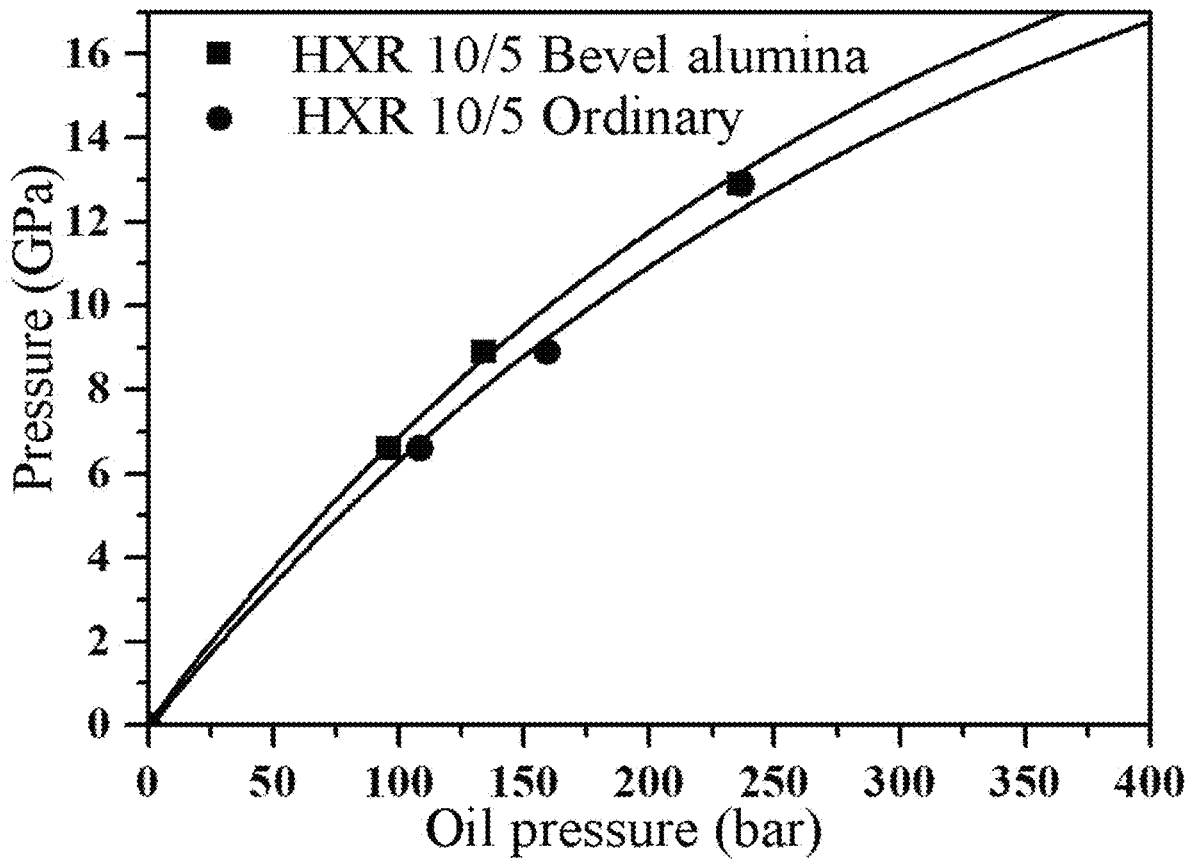
FIG. 8 is a curve graph showing a loading oil pressure versus a cavity pressure in the large-volume press according to Example 2.

Zinc telluride, a molybdenum pillar, a magnesium oxide tube, a magnesium oxide sample chamber, a conductive bevel alumina plug and a magnesium oxide octahedron after annealing treatment were assembled according to a structure shown in FIG. 1 and then placed in a large-volume press, and then subjected to the pressure correction experiment of the large-volume press by boosting the pressure at a boosting rate of 3 min/bar. During the pressure correction experiment, the change of a resistance value of the sample was recorded at all times, and a curve of the resistance of ZnTe pressure standard versus an oil pressure was drawn, as shown in FIG. 7. It can be determined from FIG. 7 that the phase transition pressure points of the ZnTe are respectively at 6.6 GPa (zinc blende), 8.9 GPa (cinabar) and 12.9 GPa (Cmcm), corresponding to abrupt change points of the resistance. An internal pressure of the cavity was calibrated by using the abrupt change of the resistance of the ZnTe caused by the phase transition at a high pressure, and a relationship between a loading oil pressure versus a cavity pressure in the large-volume press was established and determined, as shown in FIG. 8. In FIG. 8, a curve with black squares is an accurate pressure calibration curve based on a shear pressure produced by the aluminum bevel plug, and a curve with black circles is a pressure calibration curve based on the molybdenum pillar. It can be found by comparing that there is a big difference between a non-shear pressure calibration curve and a shear pressure calibration curve, and it is necessary to calibrate a shear pressure curve.

Although the present disclosure is described in detail in conjunction with the foregoing embodiments, they are only a part of, not all of, the embodiments of the present disclosure. Other embodiments can be obtained based on these embodiments without creative efforts, and all of these embodiments shall fall within the scope of the present disclosure.

What is claimed is:

1. A method for calibrating a deformation pressure of a large-volume press, comprising the following steps:
   depositing a conductive layer onto a surface of a bevel plug to obtain a conductive bevel plug; and
   assembling the conductive bevel plug, a molybdenum pillar, a magnesium oxide tube, a magnesium oxide sample chamber, a magnesium oxide octahedron and a calibration standard material, placing a resulting system in the large-volume press, and subjecting the resulting system to a large-volume press pressure correction experiment.

2. The method of claim 1, wherein the bevel plug is a diamond bevel plug or an alumina bevel plug.

3. The method of claim 1, wherein an inclined plane of the bevel plug has an angle of 45°.

4. The method of claim 1, wherein the conductive layer is made of copper or molybdenum.

5. The method of claim 1, wherein the conductive layer has a thickness of 1.62 μm to 1.65 μm.

6. The method of claim 1, wherein the calibration standard material is zinc telluride.

7. The method of claim 6, wherein prior to the assembling, the method further comprises: grinding the zinc telluride, and then conducting an annealing treatment.

8. The method of claim 7, wherein the annealing treatment is conducted at a temperature of 98° C. to 102° C. for 1.8 h to 2.2 h.

9. The method of claim 8, wherein heating to the temperature for the annealing treatment is conducted at a heating rate of 4° C./min to 6° C./min.

10. The method of claim 2, wherein an inclined plane of the bevel plug has an angle of 45°.

11. The method of claim 4, wherein the conductive layer has a thickness of 1.62 μm to 1.65 μm.

* * * * *